UNITED STATES PATENT OFFICE.

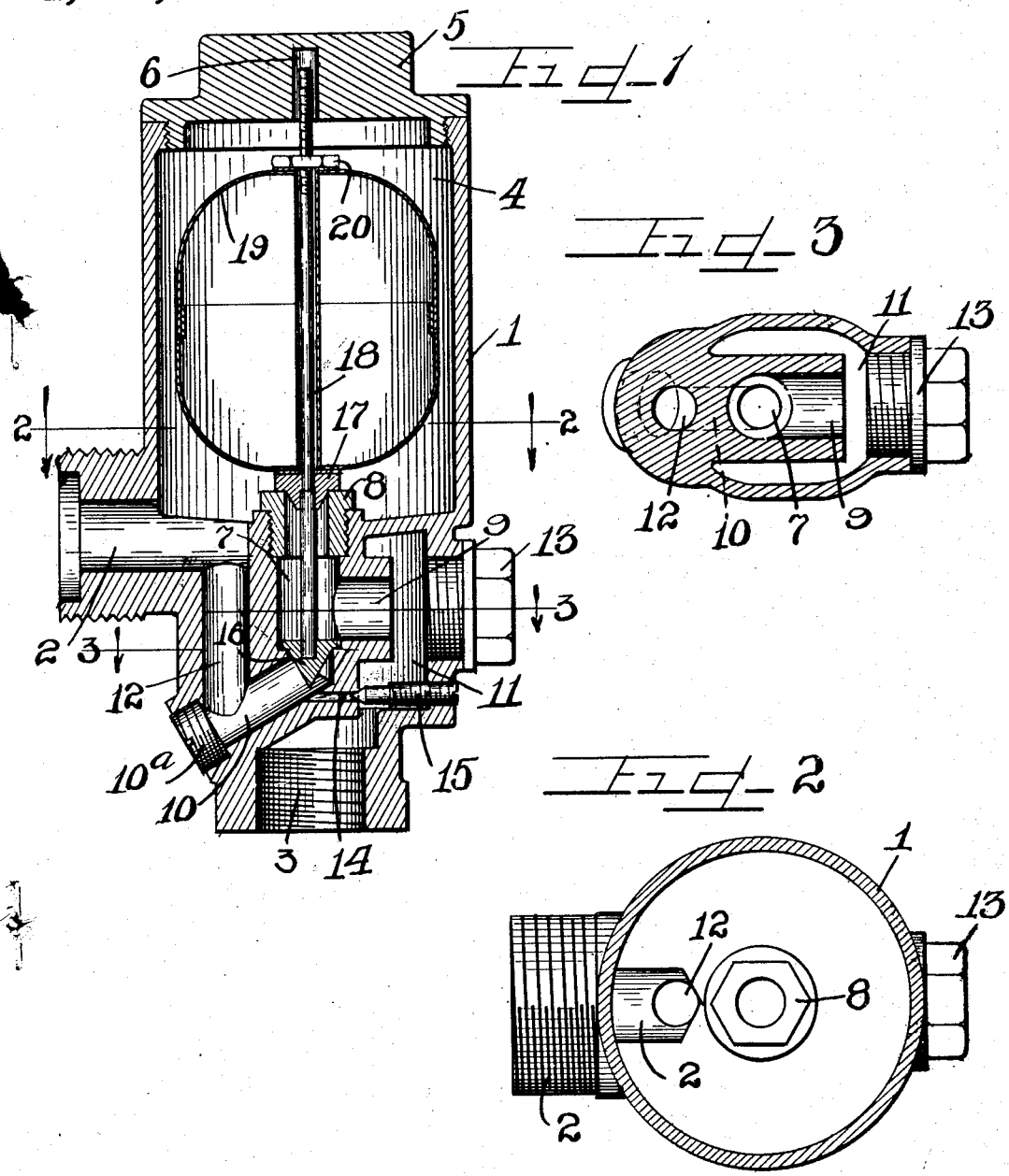

WILLIAM B. POINDEXTER, OF CHICAGO, ILLINOIS, ASSIGNOR OF ONE-HALF TO ULYSSES S. JENKINS, OF CHICAGO, ILLINOIS.

RADIATOR-VALVE.

1,146,276.  Specification of Letters Patent.  Patented July 13, 1915.

Application filed February 24, 1913.  Serial No. 750,130.

*To all whom it may concern:*

Be it known that I, WILLIAM B. POINDEXTER, a citizen of the United States, and a resident of the city of Chicago, in the county of Cook and State of Illinois, have invented certain new and useful Improvements in Radiator-Valves; and I do hereby declare that the following is a full, clear, and exact description of the same, reference being had to the accompanying drawings, and to the numbers of reference marked thereon, which form a part of this specification.

As heretofore constructed radiator relief valves have been sluggish in action, due to the fact that where a float is depended upon to open the valve, the differences of pressure exerted on each side of the valve closure has necessitated an extra accumulation of water in the float chamber of the valve, in order to exert a buoyant effect upon the float sufficient to overcome such difference in pressure on the opposite sides of the valve to open the same.

It is desirable in such types of valves to construct the movable elements of such light material that the valve will be sensitive and not be retarded in its opening due to the weight of the parts. At times when the radiator is shut off, the resultant condensation taking place therein produces a vacuum which is sometimes considerably more than that existing in the exhaust line. When such a condition occurs oftentimes the water in the return line will rush back through the radiator vent valve and fill the radiator with water, causing during its action an injurious hammering effect.

It is an object of this invention to provide a radiator relief valve, the moving parts of which are relatively light, and one in which no amount of difference in pressure on the opposite sides of the movable valves will cause the same to open to permit the water from the returns to enter the radiator.

It is also an object of this invention to provide a balanced radiator valve in which the force necessary to open the valve need only be sufficient to overcome the inertia of the moving parts, and is independent of other pressures.

It is also an object of this invention to provide a device having double connected valves adapted to operate independent of the pressures existing on the opposite sides thereof.

It is also an object of this invention to provide a casing for connected balanced valves, which is automatically drained by means of an auxiliary thermostatic valve.

It is also an object of this invention to provide a radiator valve equipped with an auxiliary valve adapted to drain the casing of small quantities of water collecting therein.

It is also an object of this invention to provide a device comprising balanced valves of relatively wide area of opening and an auxiliary thermostatically operating valve of relatively small area of opening such that the smaller thermostatic valve will serve to vent the radiator of air and small quantities of water and the larger balanced valve will act to permit the discharge of large quantities of water from the radiator when so desired.

It is furthermore an object of this invention to provide a device whereby the auxiliary thermostatic valve may be adjusted at any time from the exterior of the device, and wherein the device is provided with inspection apertures for the purpose of examining each of the valves without disconnecting the device from the radiator.

It is finally an important object of this invention to construct a cheap, simple and durable device consisting of few parts, and adapted to be connected and adjusted to a radiator by one not having previous experience.

The invention (in a preferred form) is illustrated in the drawings, and hereinafter more fully described.

In the drawings, Figure 1 is a transverse vertical section taken centrally of a device embodying the principles of my invention. Fig. 2 is a transverse horizontal section on line 2—2 of Fig. 1 with parts omitted. Fig. 3 is a transverse horizontal section taken on line 3—3 of Fig. 1 with parts omitted.

As shown in the drawings, the device consists of the casing 1, provided with the exteriorly threaded inlet 2, and the internally threaded outlet 3. The upper portion of the casing affords a float chamber 4, which is closed by the threaded cap 5, provided with the axial bore 6, in the under side thereof. The lower portion of said casing is provided with the central aperture 7, which has threaded in the upper end thereof the removable valve seat 8, and communicating with said passage 7, are the passages 9 and 10 respectively. The passage 9 is directed transversely and communicates with the semi-annular passage 11, and the inclined passage 10, on the other hand affords communication between one end of said passage 7, and the passage 12, which extends from the inlet passage 2, to said inclined passage 10. As shown, said semi-annular passage 11, communicates with the outlet 3, and the wall of the casing affording a part of the passage 11, is provided with an inspection aperture in which is threaded the plug 13. The plug 13 is removable and affords a means of inspecting the operation of the valves and permitting the insertion of a thermometer for taking the temperature of vapor passing therethrough. A small plug 10ª, is likewise threaded in the casing to close the lower end of the passage 10, such openings affording access to the interior of the casing for adjustment of the mechanisms. The passage 10, is connected to the passage 11, by means of the small passage 14, which is adapted to be closed by means of the expanding thermostatic needle valve closure 15, which is threaded into the casing, and is thereby adjustable.

The walls of the passage 7, are flanged inwardly at the lower end thereof to afford a valve seat for the valve closure 16, which, together with the valve closure 17, seating on the seat 8, is rigidly secured to the valve stem 18, thus constraining each of said valve closures to move together. The upper end of said valve stem 18, extends into the axial aperture 6, in the cap 5, which serves to guide the stem in its movement. Secured on said valve stem 18, and movable within the float chamber 4, is the air tight spun copper float 19, which is slidable on the valve stem, and limited in its lower movement thereon by the closure 17, and in its upward movement by the adjustable nut 20, threaded on the upper end of the valve stem.

The operation is as follows: Referring to Fig. 1, it will be seen that the outer surfaces of each of the valve closures 16 and 17 respectively are each acted upon by the fluid contained in the casing, and, inasmuch as said surfaces are oppositely directed, the pressure exerted by the fluid on the valve closures is equalized and hence no extra initial force is required to lift the valves from their seats. On the other hand, such balancing of the valves also serves to prevent opening thereof, should for any reason the pressure in the return line be greater than that in the radiator to which the device is attached, inasmuch as in such case, the pressure in the passage 7, would be exerted both upwardly and downwardly on the respective valve closures 17 and 16, thereby preventing the opening of either to permit a reverse flow to take place. The passages 10, and 12, as disposed serve to form a water pocket, and in order to prevent the formation of a water seal therein or a collection of an undue quantity of water, which might interfere with the operation of the valve, the small drain aperture 14, is provided which communicates with the passage 11, to drain the water pocket. In order to control the quantity of fluid flowing therethrough the thermostatic adjustable needle valve 15 engages in one end of said passage 14, and when the device is clear of water the passage of hot steam or vapor therepast causes the element 15, to expand and close the passage. However, when a sufficient quantity of water has collected within the trap afforded by the passages 10 and 12, to cool the valve 15, it contracts and opens the passage, permitting the water to drain therethrough.

When the device is required to handle large quantities of water, as for instance, when the steam is first forced into a radiator forcing the water of condensation therethrough, the water fills the casing 1 and elevates the float 19, thereby opening each of the large valves 16 and 17, and affording a wide opening for the flow of water. When it is desired to inspect the valve mechanism the plug 13, may be readily removed, and, with the removal of the cap 5, access is readily afforded to the whole of the interior of the device without detaching the same from the radiator.

I am aware that details of construction and arrangement of the passages are open to wide variation, and I therefore do not purpose limiting the patent granted otherwise than as necessitated by the prior art.

I claim as my invention:

1. In a device of the class described, a casing having inlet and outlet passages, a balanced valve in said casing between said inlet and outlet, a float connected with said valve and adapted to operate the same, and an auxiliary thermostatically controlled needle valve on the inlet side of said balanced valve and adapted to drain the casing of small quantities of water.

2. In a device of the class described, a casing having an inlet and a plurality of outlet passages therein, a balanced valve controlling one of said outlet passages, and a thermostatically controlled auxiliary valve on the inlet side of said balanced valve and operating to control the other of said outlet passages.

3. In a device of the class described, a casing having an inlet and a plurality of outlet passages therein, a balanced valve controlling one outlet passage, an angled passage in said casing permitting inspection and testing of said valve, a removable plug normally closing the outer end of said passage, and a removable plug threaded in the side of said casing in alinement with said balanced valve outlet passage to permit access to said balanced valve.

In testimony whereof I have hereunto subscribed my name in the presence of two subscribing witnesses.

WILLIAM B. POINDEXTER.

Witnesses:
 LEON M. REIBSTEIN,
 LAWRENCE REIBSTEIN.